Patented Mar. 6, 1923.

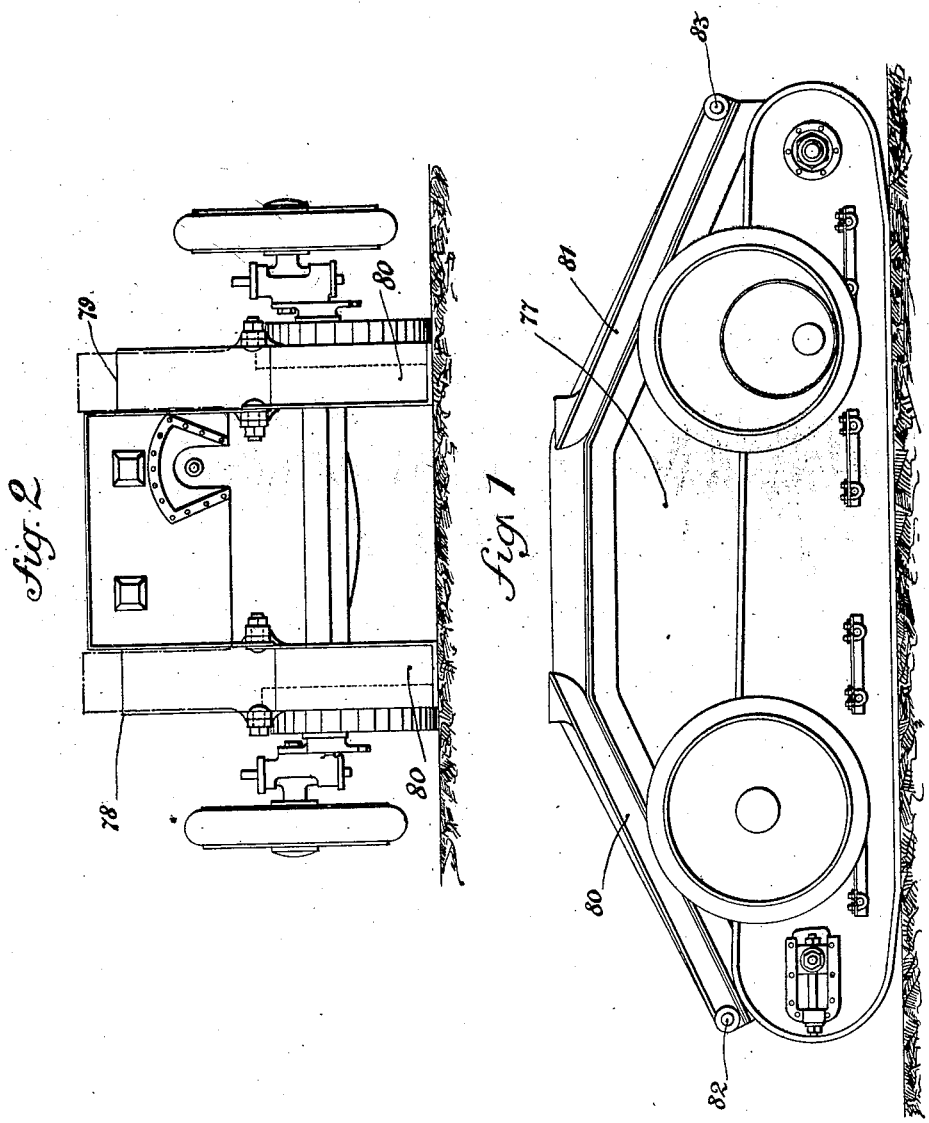

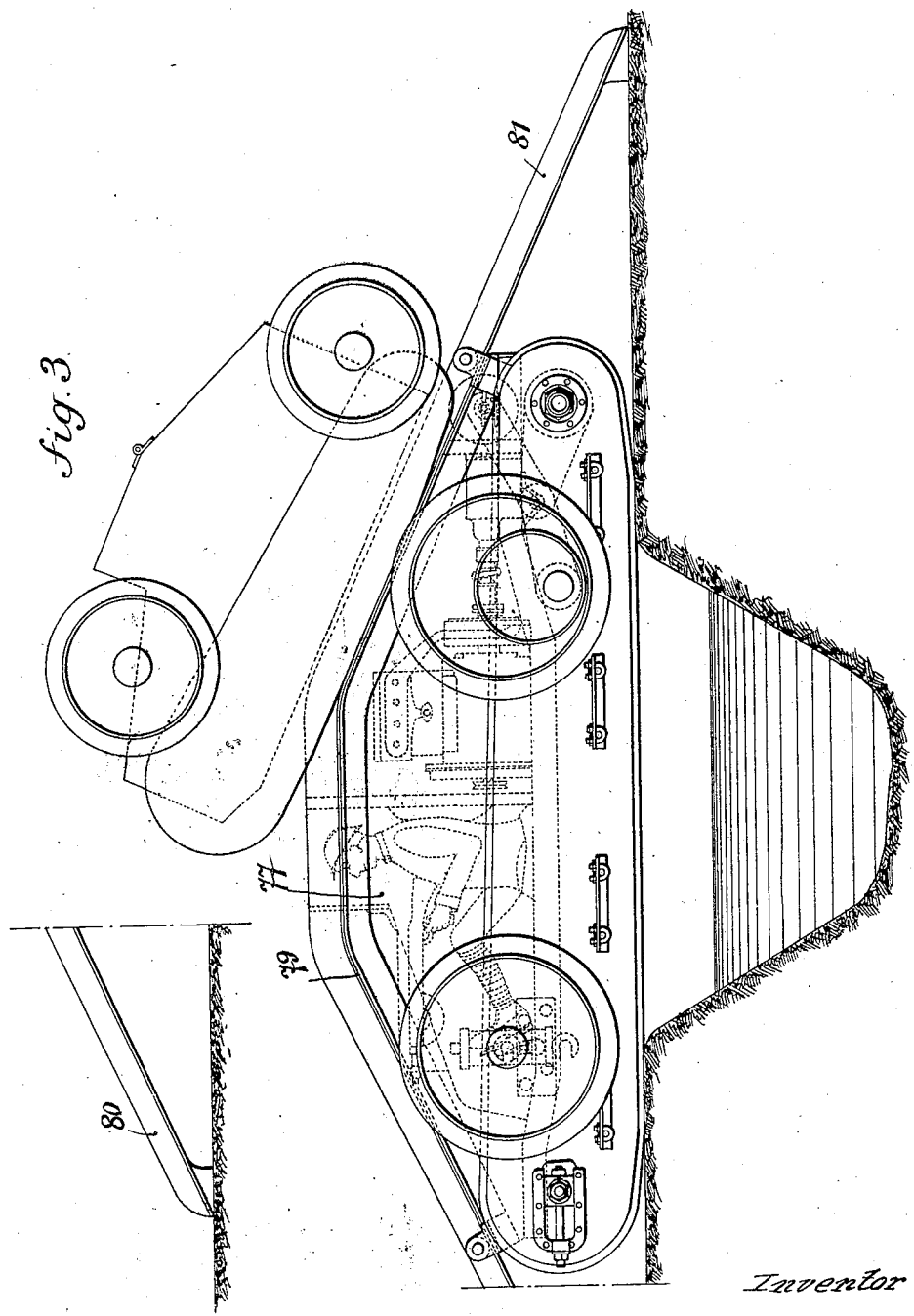

1,447,893

UNITED STATES PATENT OFFICE.

IRÉNÉ ROY, OF PARIS, FRANCE.

ENDLESS-TRACK VEHICLE.

Application filed July 14, 1921. Serial No. 484,755.

(GRANTED UNDER THE PROVISIONS OF THE ACT OF MARCH 3, 1921, 41 STAT. L., 1313.)

*To all whom it may concern:*

Be it known that I, IRÉNÉ ROY, a citizen of the Republic of France, and residing at Paris, Seine Department, No. 12 Rue de la Rochefoucauld, in the Republic of France, engineer, have invented certain new and useful Improvements in Endless-Track Vehicles (for which I have filed an application in France on July 10, 1919, Patent No. 512,166), of which the following is a specification.

This invention relates to improvements in endless-track vehicles, and more particularly to those of the type described in the co-pending application No. 392,308 filed by me in the United States on July 14, 1921 when used for a military purpose.

These improvements allow of the vehicle constituting a bridge across difficult passages such as wide trenches ditches or the like, for the passage of other or smaller vehicles such as storming tanks which otherwise would find the passage impracticable.

To this end, the roof of the vehicle is hump shaped comprising a gentle gradient in front and behind and inclined planes are provided for connecting the said gradients with the ground.

In the accompanying drawing which illustrates by way of example, one mode of construction according to the present invention:—

Fig. 1 is a transverse elevation of the vehicle.

Fig. 2 is a front view.

Fig. 3 shows the vehicle in position as a bridge.

77 is an armoured motor car provided with double propulsive means consisting of wheels and endless tracks, the steering wheels have eccentric axles and the rear driving wheels have eccentric hubs. The wheel base follows the usual dimensions, but the spacing of the endless track pulleys is increased in order to make the endless track girder as long as possible for the purpose of crossing over obstacles.

At the top of the vehicle is disposed a double roller path 78 and 79 which is extended down to the ground by means of the inclined planes 80 and 81, these being articulated at 82 and 83, whereby the vehicle can be used as represented in Fig. 3 or in the contrary case, it can assume a position entirely at the bottom of the trench or ditch which is to be cleared. When on the road, the inclined planes are raised as shown in Fig. 1.

Claims:

1. A motor vehicle with endless tracks comprising a vehicle frame, endless tracks, a box body provided at the top with a roller path, and articulated inclined planes enabling other endless track vehicles to travel over said vehicle as upon a bridge.

2. A motor vehicle with endless tracks, comprising a vehicle frame, endless tracks, a box body provided at the top with a roller path, and articulated inclined planes enabling other endless track vehicles to travel over said vehicle as upon a bridge, said inclined planes folding upon the top of said box body when not in use.

In testimony, that I claim the foregoing as my invention I have signed my name in presence of a subscribing witness.

IRÉNÉ ROY.

Witness:
MAURICE ROUX.